Patented Feb. 20, 1945

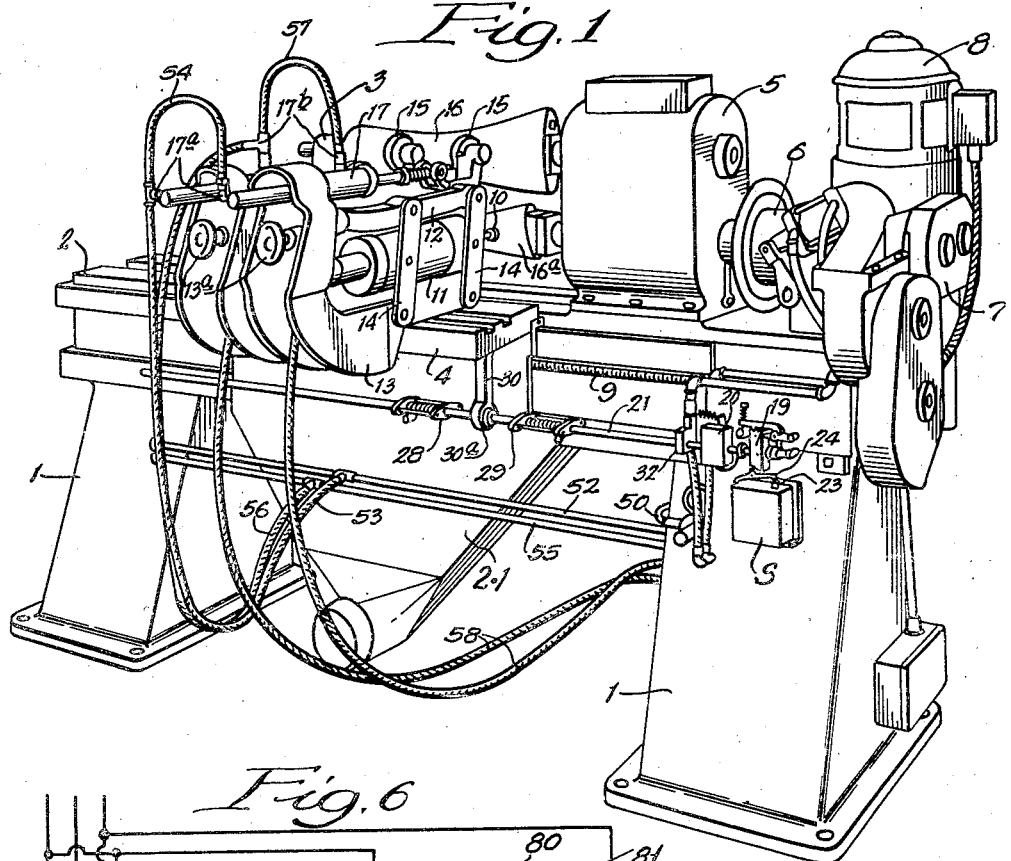

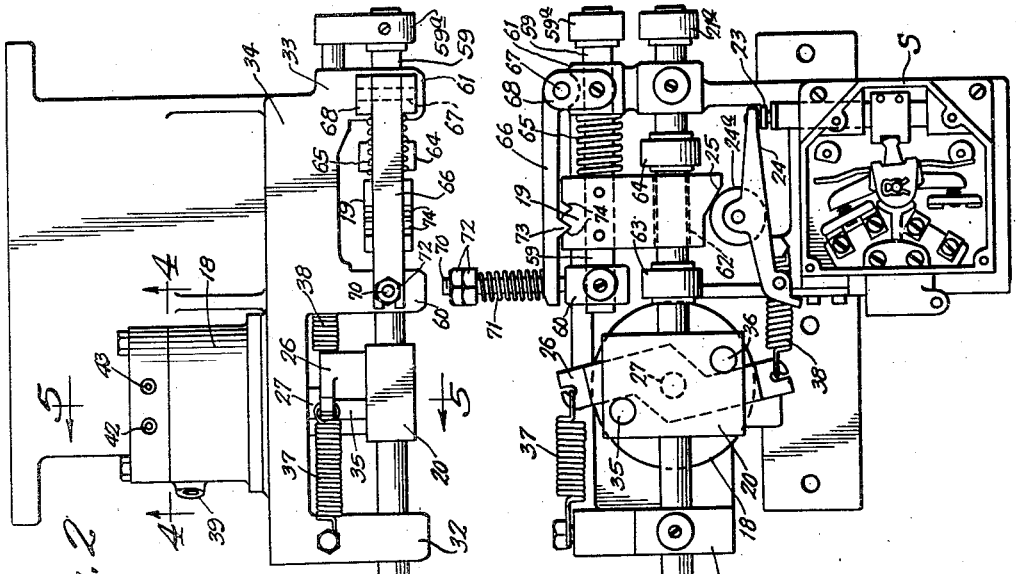

2,370,032

UNITED STATES PATENT OFFICE 2,370,032

COPY LATHE CONTROL

Willem Groen, Chicago, Ill., assignor to Onsrud Machine Works, Inc., Chicago, Ill., a corporation of Illinois Application February 1, 1943, Serial No. 474,305

15 Claims. (Cl. 82—14)

This invention relates to control devices and particularly control devices for copy lathes and other shaping apparatus wherein a traveling tool carrier must be automatically stopped at the end of each stroke, its drive reversed, and then its travel started in the opposite direction.

As shown and described herein, the invention is embodied in a multiple spindle copy lathe having a plurality of shaping tools which, upon following a template or pattern, perform a complete shaping operation in one pass of the tool carriage and, then upon reversal of the direction of travel of the tool carriage, perform a complete shaping operation upon a new blank during the return pass while following the same template or pattern. In other words, a complete article is turned out during each pass of the reciprocating tool carriage.

The invention herein described and claimed is embodied in such a machine for the purpose of automatically stopping the tool carriage at the end of a pass of a predetermined length and substantially at the same time automatically releasing the cutting tools and guides from engagement with the work and the pattern and reversing the direction in which the tool carriage can travel when the same is again started, the restarting of the tool carriage being under the control of the operator.

The main objects of this invention are to provide an improved control device whereby the traveling tool carriage of copy lathes and similar apparatus may be automatically stopped at the end of each pass and automatically caused to travel in the reverse direction upon being manually restarted; to provide such a control device that will cause automatic disengagement of the cutting tools from the work upon stoppage of the tool carriage at the end of each pass and automatic engagement of the cutting tools with the work upon restarting of the carriage travel in the opposite direction; to provide such a control device having adjustable control actuating means whereby the length of each pass of tool carriage may be varied and predetermined in accordance with the work involved; to provide an improved control device for automatically reversing the direction of the rotation of a tool carriage drive motor and automatically operating a rotary pneumatic valve upon the completion of each predetermined working operation; to provide such a control device in which a two-position rotary pneumatic valve is automatically set to one position upon stopping of the work carriage and automatically set to the other position upon the starting of the work carriage, regardless of the direction in which the work carriage may have traveled; and to provide an improved control means for traveling tool carriages which will automatically stop travel of the tool carriage at a predetermined position and simultaneously operate switch electric connections for a carriage drive motor to effect reversal of the same upon completion of the power circuit by means of a manually operated switch.

A specific embodiment of this invention is shown in the accompanying drawings in which:

Figure 1 is a perspective view of a multiple spindle copy lathe, looking at the rear side thereof, showing details of the improved control device as it may be used in that type of machine.

Fig. 2 is a top plan view of the improved control device as embodied in the copy lathe shown in Fig. 1.

Fig. 3 is a front elevation of the control device showing details of the switch and air valve actuating means.

Fig. 4 is a vertical sectional view of air valve taken on the line 4—4 of Fig. 2, and looking in the direction of the arrows.

Fig. 5 is a vertical sectional view of the air valve and valve actuating means as taken on line 5—5 of Fig. 2, and looking in the direction of the arrows; and Fig. 6 is a diagram showing the electrical connections for automatic stopping of the tool carriage drive motor and switching of electrical connections thereto for reversal of the carriage upon manual operation of means for restarting the drive motor.

Fig. 7 is a diagrammatical showing of the air valve and fluid system.

As shown in the drawings the multiple spindle copy lathe, in which the present invention is embodied for illustrative purposes, comprises a pair of upstanding base members, or supports, 1 on which is mounted a heavy horizontal bed 2 having a top slide-way for an adjustable tail stock 3 and a side slide-way for a traveling carriage 4 respectively. A head stock 5 is mounted near one end of the bed 2 and is connected through a clutch 6 to suitable actuating gears which are housed in a gear box 7 and driven by means of a motor 8 disposed with its axis vertical, the gear box 7 and motor 8 being mounted at the end of the bed 2.

The tail stock 3 and head stock 4 are each provided with a pair of spindles disposed one above the other in suitable spaced relation and alined with their cooperating opposite spindles on parallel axes. The uppermost tail stock and head stock spindles are arranged to carry the pattern or template 16 between them and the lowermost tail stock and head stock spindles are arranged to carry the work 16a. The lowermost tail stock spindle, not shown, is provided with the usual hand wheel to permit the operator to readily place the work blank 16a between the centers of the two lower spindles. The pattern and the work respectively are rotated in the same direction and at the same speed by means of suitable crank shafts and connecting rods, not shown, interconnecting the upper and lower head stock spindles and completely enclosed within the head stock 5, the lower crank shaft which carries the lower spindle receiving its power directly from the driving mechanism in gear box 7 through the medium of the clutch 6.

The tool carriage 4 supports a plurality of high-speed motor-driven cutters, and it is arranged to traverse the rotating work 16a by traveling along the side slide-ways of the lathe bed when actuated by means of a screw feed 9 which receives its power from suitable gears located within the gear box 7 at the end of the machine.

Each cutter head 10 is driven by its individual motor 11 (one being visible in Fig. 1) which is suspended from a support bar 12, the support bar 12 being mounted on a frame 13 by means of parallel links 14 pivotally connected between the support bar and the frame and extending upwardly from each side thereof. Each cutter and motor unit is mounted in its own frame 13 and has its own support bar 12 and connecting links 14, and these frames are suitably clamped onto the carriage 4 in desired spaced relation and so as to present the cutters at the desired angle to the work, the frame clamping arrangement being adjustable in these respects by hand wheels 13a.

The principle of the machine illustrated herein, as embodying the present invention, involves the use of a number of small diameter end mill cutters mounted in high-speed cutter-heads arranged for in-and-out motion governed by air cylinders. Action of each head 11 is controlled independently by a guide roller 15, which follows the pattern 16 disposed above the blank 16a being operated upon, said pattern being mounted between the alined upper spindles of the respective tail stock 3 and the head stock 5. The air cylinders 17 are of double-acting construction and serve to pneumatically force the cutter heads 10 towards the work 16a and to hold the guide rollers 15 in contact with the pattern 16, as well as to withdraw or retract the cutting heads 10 and the guide rollers 15 from engagement with the work and the pattern respectively, according to the direction in which the air pressure is acting upon the pistons in the air cylinders 17.

As will be readily understood, this machine in operation rotates the work and the pattern in unison and at the same time drives the carriage so that the cutter heads will traverse the work, the power for rotating the head stock spindles and also for driving the carriage 4 being supplied by the motor 8.

The guide wheels 15 follow the contour of the rotating pattern and cause a corresponding movement of the cutters while the cutter carriage 4 traverses the length of the pattern, and due to the high speed of the cutters, which may be 14,400 R. P. M. or more, a complete shaping operation is accomplished during a single pass of the carriage 4 in either direction of its reciprocating travel.

The purpose of the present improvements is to control the operation of the machine so that the carriage 4 will be automatically stopped at the end of each pass, at which time the cutter heads will be automatically withdrawn from engagement with the work and the electrical connections controlling the operation of the motor 8 will be automatically shifted so as to reverse the direction in which the motor 8 will run when it is again started for the return pass of the machine.

With an automatic control of the machine, such as herein contemplated, the operator may tend several machines. His work involves merely replacing the finished article with another blank when the machine stops at each end of a pass and then throwing a single switch to restart the machine for the next shaping operation.

In the form shown herein, the improved control devices comprise an electrical snap action dual circuit limit switch S, a two-position three-way air valve 18, operating means 19 and 20 for respectively controlling the switch and air valve and a control shaft 21 for actuating the valve and switch-operating means.

In the electric diagram (Fig. 6), I have shown instrumentalities for the control of the motor 8 which actuates the work, the template, and the reciprocable carriage. There is a three-position selector-type switch 80 which preferably bears symbols such as "forward," "off," and "reverse" for the ready observance of the attendant, and there is a limit switch 81 of the snap-action, single-pole, double-throw type (S) interposed across two of the three conductors. Forming a circuit will energize either of the two solenoids 82 and 83 for forward (F) or reverse (R) movement of the motor 8 through the medium of selector switches 82a, 82b, and 82c which are actuated by the solenoid 82, or the switches 83a, 83b, and 83c which are actuated by the other solenoid 83. These solenoid operated switches are interposed in the three-line conductor circuits leading to the feed motor 8 and thus control the actuation and direction of rotation of said motor through two selected conductors of the three-line circuit, or the motor may be stopped when all three circuits are broken.

The limit switch S is arranged to provide two independent circuits, the one normally opened and the other normally closed which are alternately operated whenever the switch mechanism is shifted from one position to another. The operation of this limit switch serves to simultaneously stop the main drive motor 8 by de-energizing the solenoid which was operative to maintain the circuit to the motor closed and to immediately move to a position in which an energizing circuit is set up through said other solenoid, but which circuit is left open at the manual switch 80. Thus, when the attendant again turns on the manual switch 80, the said other solenoid will be energized to close the circuit to the motor which will be restarted and will operate in the opposite direction from which it was running when it was stopped by automatic opening of the limit switch. Restarting of the motor 8 after each stop is had by means of a manually operated circuit closing switch (schematically shown at 80 in Fig. 6) which is positioned on the front side of the machine which is opposite the side shown in Fig. 1, so that said circuit-closing switch 80 is readily accessible to the machine operator.

The switch S is actuated by means of a reciprocable plunger 23 which in turn is controlled by a rocker arm 24 carrying a roller 24a, the plunger 23 being normally urged towards the free end of rocker arm 24, by a spring, not shown. The rocker arm 24 is operated by the switch control means 19 which is positioned above said rocker arm 24 and is provided with a downwardly projecting cam portion 25 and which is shiftable longitudinally between two positions while contacting the roller 24a, as will be hereinafter described.

The air valve 18 is of the rotary type and is shiftable between two operating positions so as to control the flow of compressed air in either of two directions. An operating dog 26 is keyed to a valve operating rock-shaft 27 that is rotatably shifted between its two operating positions of the air valve by means of the air valve control means 20.

As shown in Figure 1 the assembled control apparatus is mounted on the rear side of the machine at one end and the main control actuating rod 21 extends longitudinally of the machine and parallel with the path of travel of the sliding tool carriage 4. Yieldable adjustable stops 28 and 29 are mounted in spaced relation to each other on the main control shaft 21 and a depending actuating arm 30, having an eye through which the control shaft 21 passes, is provided on the tool carriage 4 for engagement with the stops 28 and 29 so as to shift the main control rod 21 axially to effect operation of the control mechanism.

The control shaft 21 passes slidably through the eye of the control actuating arm 30 which is preferably provided with a pair of bushings 31 to receive the control rod 20 with a free sliding fit.

The control operating end of the main control rod 21 is slidably supported in spaced bearing lugs 32 and 33 which project outwardly from a control mounting member 34, at the side of the adjacent support 1 of the apparatus. Thus the control rod 21 is supported solely by the control mounting member, at the control operating end of the rod 21, and by the actuating arm 30 which projects downwardly from the tool carriage 4.

As shown in Figures 2 and 5, the air valve actuating cam 20 is transversely drilled to receive the control rod 21 therethrough and it is fixed on the control rod 21 so as to be shiftable therewith. This cam member is provided with a pair of vertically spaced and laterally offset, inwardly projecting pins 35 and 36 each of which is arranged to engage a leg of the valve-operating dog 26. The dog 26 is of somewhat Z-shape, as detailed in Fig. 3, with a pair of opposed legs which are respectively offset on different sides of the axis of the air valve shaft 27 with their operating edges tangent to the pins 35—36 and oblique to a vertical plane at a right-angle to the axis of the control rod 21. In this manner the opposed legs of the dog 26 are engaged by the inner sides of the pins 35 and 36, that is, the sides of these pins which are nearest the plane of the axis of the valve rock-shaft 27.

Normally the position of the valve-operating dog 26 is that shown in Figure 3, and the dog 26 is normally urged to this position by means of tension springs 37 and 38 which are fastened between the free ends of the respective legs of the dog and certain fixed parts of the control mounting member 34. Thus, when the carriage 4 reaches the end portion of its movement in either direction, the actuating arm 30 moving along the control rod 21 is adapted to engage one or the other of the stops 28 and 29 and thereby shift the rod 21 in the direction in which the carriage is traveling, and this shifting of the control rod 21 will cause one of the legs of the valve-operating dog 26 to engage a pin 35 or 36 and rotate the air control valve 18. For example, the longitudinal shifting of the main control operating rod 21 towards the right (Fig. 3) by reason of the actuating arm 30 contacting stop 29 will engage the upper leg of the dog 26 with the pin 35 to move the valve body 18 in a clockwise direction. On the other hand, when the actuating arm 30 moves away from the stop 29, the springs 37—38 will return the adjacent parts to their normal positions as shown in Fig. 3, so that the engagement of the actuating arm 30 with stop 28 will shift the rod 21 to the left so that the lower dog arm will be engaged by pin 36 and said pin will again actuate the valve body 18 in a clockwise direction.

As shown in Figs. 4 and 5 the air valve 18 is provided with an inlet 39 which leads to an inner chamber 40 in which a valve member 41 is mounted on the shaft 27 and disposed so as to oscillate between predetermined valving positions. The valve housing 18 is also provided with two angularly spaced outlet ports 42 and 43 and a bleed port 44 located midway between said outlet ports; and the valve member 41 is provided with a passage 45 in the side nearest the outlet ports 42 and 43 which passage is of such length as to interconnect the bleed port 44 and one or the other of the outlet passages 42 and 43.

Thus in one position, such as that shown in Fig. 4, the valve member 41 interconnects the passages 42 and 44 and leaves the passage 43 in communication with the inner chamber 40 of the valve body; and when the valve member 41 is shifted clockwise, it will bridge and interconnect the bleed passage 44 and the outlet passage 43, leaving the passage 42 in communication with inner chamber 40. In this manner compressed air introduced to the inner chamber 40 through the inlet 39 may be alternately directed first through the outlet 43 and then through the outlet 42 according to the position in which the member 41 might be set.

As shown in Figure 5, the valve member 41 is provided with a pair of compression springs 46 which are seated in sockets 47 formed in the valve member on the side opposite that nearest the outlet ports 42 and 43, which springs, acting against the adjacent wall of the valve chamber 40, constantly urge the valve member 41 into frictional engagement with the surface of the wall in which the outlet ports are located so as to provide tight seal against leakage of compressed air from the valve chamber 40 through the bleed port 44 and the outlet port that may be covered by valve member 41.

A feed line 50, which is provided with a regulator gauge 51, leads from a suitable compressor to the inlet stub 39 of the valve 18 to supply the required pressure to the system for actuating the instrumentalities which bodily shift the guide rollers 15 and motors 11 and for operating the electric control switch devices. The compressed air, upon leaving the control valve outlet port 43, is led through a conductor pipe 52 to a flexible hose 53 which communicates with the arched pipe 54 and discharges the compressed air through couplings 17a into the cylinders 17 upon the outer sides of the pistons to force the latter towards the pattern or template 16, thereby causing the guide rollers 15 to intimately contact the latter.

Similarly, the compressed air which leaves the other outlet port 42 of the control valve passes through a conductor pipe 55 to another flexible hose 56 which is in communication with a second arched pipe 57 to discharge the compressed air through couplings 17b into the cylinders 17 upon the other sides of the pistons, thereby effecting the reverse movement of the pistons to withdraw the guide rollers 15 from their contacting relation to the template 16. The rollers 15 are rotatably carried in suitable structures which are mounted upon the frames 12 so that whenever the rollers are bodily shifted towards or from the template the shaping cutters 10 and their motors 11, which also are mounted in the movable frames, will simultaneously be moved towards or from the template. The bodily shifting of the rollers and cutters away from the work and pattern takes place automatically whenever the actuating arm 30 engages the one or the other of the stops 28 or 29 and moves the control actuating rod 21, due to shifting of the valve 18 from a position in which air under pressure is in the outer end of the cylinder 17 to a position in which the outer ends of the cylinders are open to exhaust through the port 44 and in which latter position air under pressure is admitted to the inner ends of said cylinders. As hereinbefore explained, the longitudinal movement of this rod 21 also actuates the electric control limit switch S which stops the main motor 8 but which does not effect the continuity of the circuits through flexible conductors 58, to the cutter motors 11. As previously stated, however, actuation of the limit switch S by the carriage arm 30 sets up a circuit through one or the other of the solenoids 82 or 83 which causes the reversal of rotation of the carriage feed shaft or screw 9 after the finished piece of work has been removed and replaced by a new blank 16a and the return pass of the machine has been commenced by the attendant throwing the starting switch at the front of the apparatus.

The block forming the control member 19 and its lower cam element 25 is anchored to a shift spindle 59 which is mounted for longitudinal reciprocation in bearing bosses 60 and 61 on the apparatus above the control rod 21, as illustrated in Fig. 3, and the lower portion of this block is provided with a horizontal bore 62 to permit longitudinal movement of the adjacent end portion of the control rod 21 therein.

The shift spindle 59 projects beyond bearing boss 61 where its end has a stop 59a secured to it which has an extension provided with a guide stud 59b projecting laterally from it and sliding in a guide bore in the lug 33. The control actuating rod 21 projects beyond the boss 61 below the shift spindle and has a stop 21a secured to it which is of the same construction as the stop 59a and its guide stud is slidingly engaged in another guide bore in the lug 33. By means of this arrangement rotational movement of the shift spindle 59 and the control actuating rod 21 is prevented but said elements may be reciprocated longitudinally during operation of the apparatus.

Collars 63 and 64 are secured to rod 21 upon each side of the control block 19 so that movement of rod 21 to the right or left will cause one of these collars 63—64 to engage the block 19 and correspondingly move it. Latching means are provided for the purpose of releasably maintaining the block 19 in its shifted positions and a compression spring 65 surrounds the shift spindle 59 between the block and the bearing boss 61. The latch preferably comprises an arm 66 which is fulcrumed at one end on a pivot pin 67 which in turn is mounted in lugs 68 on the bearing boss 61, and the other end of said arm 66 is provided with a bifurcation 69 to straddle a post 70 which arises from boss 60 and which is surrounded by a compression spring 71 between the arm 66 and suitable tension adjusting lock nuts 72 screwed onto the upper threaded portion of said post. The underneath surface of the arm 66 is provided with a wedge-shaped tapered member or V-cam 73 which seats in either of the depressions of the W-shaped notch 74 formed in the upper edge of the control block 19 where said cam member 73 will remain until the next reciprocatory movement of the control rod 21.

Assuming the parts to be in the position shown in Figs. 1 and 3, it will be noted that the pivoted arm 66 of Fig. 3 has its tooth 73 engaged in the left hand notch 74 of the block 19. This indicates that the carriage 4 is on an excursion to the left as viewed in Fig. 1, after having operated the control devices associated with the slide rod 21 to have moved the block 19 into the position shown. With the carriage moving to the left by reason of the position of the limit switch 81, the next automatic operation of the machine will occur when the arm 30 of the carriage 4 strikes the limiting abutment 28 on the rod 21. Such engagement will cause shifting of the rod 21 to the left as shown in Fig. 3 which will bring about dual actuation of the valve 18 and the limit switch S. Referring first to the operation of the valve 18, it will be apparent that the pin 36 will engage the lower arm of the valve actuating rock shaft 27 to turn this shaft in a clockwise direction. Reference to Fig. 4 which shows the position of the valve when the carriage is in motion, will show that a clockwise movement of the rock shaft 27 will rotate the valve member 41 into a position in which the ports 43 and 44 are connected and in which the port 42 is placed in communication with the air chamber 40 of the valve 18. This movement of the valve exhausts air pressure from the outer ends of the cylinders 17 and admits pressure to the inner ends of the cylinders to retract the cutters and guide rollers. The valve is held temporarily in this position by the continuing engagement of the arm 30 with the abutment 28. The same sliding movement of the arm 21 which actuated the valve 18 in the manner just described, brings the abutment 64 of the rod 21 into engagement with the sliding block 19 to force the tooth 73 of the arm 66 out of the left hand notch 74 of the block and into the right hand notch thereof. This movement of the block 19 brings the high point of the cam 25 over the roller 24—a, with the result that the rocker arm 24 depresses the switch operating plunger 23 to move the limit switch S from the position shown in Fig. 6 to the dotted line position in which a circuit to the solenoid 83 is set up to be closed by actuation of the manual switch 80. The shifting of the limit switch from the position shown in Fig. 6 deenergizes the solenoid 82 which releases the contactor 82 to open the main line to the main motor 8. This results in stopping the drive of the feed screw 9 and reciprocating movement of the carriage 4. The machine is now at rest with the cutter heads and guide rollers in retracted position. The operator now removes the finished work piece and replaces it with a raw work piece and then manipulates the switch 80 to move it from full line position in Fig. 6 to the lower dotted line position thereof in which position the energizing circuit to the solenoid 83 is completed and the contactor 83 is closed to drive the motor 8 in the opposite direction. As the carriage 30 moves to the right in Fig. 1, the pressure of the arm 30 on the abutment 28 is relieved with the result that the slide rod 21 assumes its central or neutral position. This return movement of the slide rod 21 is assisted by the springs 37 and 38 which tend not only to return the valve member 41 to the position shown in Fig. 4, but also, these springs working through the respective pins 35 and 36 will tend to center the rod 21. The return of the rod 21 to central or neutral position does not affect or move the block 19 since the rod 21 slides through said block and the block is latched in the position to which it has been previously moved by the tooth 73 of the lever 66. The machine will now continue to operate to feed the carriage 4 to the right as shown in Fig. 1, until the abutment 30 engages the abutment 29, at which time the rod 21 will be shifted to the right as shown in Fig. 3. This will cause the similar shifting of the valve 18 from the position shown in Fig. 4 to a position in which the line connected to the port 43 is vented through the exhaust port 44 and air is admitted to the port 42 to retract the cutters and guide rollers. The block 19 is shifted by the abutment 63 to the right to bring the locking tooth 73 from the right hand notch to the left hand notch 74 of said block to move the high point 25 of the roller 24—a into the position shown in Fig. 3, so that the switch operating plunger 23 may be projected into its elevated position to shift the limit switch S back into the position shown in full lines in Fig. 6. The actuation of the limit switch as just described, deenergizes the solenoid 83 which opens the main contactor to the motor 8 which therefore stops and the carriage 4 is similarly brought to rest with the cutters and guide rollers retracted. All chips, shavings, cuttings, etc. from the workpiece will fall downwardly into the chip remover 2.1.

Although but one specific embodiment of this invention is herein described, it is to be understood that some of the details set forth may be altered or omitted without departing from the spirit of the invention as defined by the following claims.

I claim:

1. A copy lathe comprising a reciprocable carriage; a reciprocable control rod adjacent said carriage; stops on said rod engaged by said carriage at the end of each pass of the latter; a template; a work piece; driving means for rotating said template and work piece; devices on said carriage for delineating the contour of said template upon said work piece; pneumatic means for normally maintaining a portion of said devices in contact with said template; a swinging frame for normally maintaining another portion of said devices in operative engagement with said work piece; a control valve actuated by said control rod for reversing said pneumatic means to disengage said devices from said template and work piece; a reversible motor; a clutch operatively connecting said motor to said driving means; a reversing electric switch interposed in the electric circuit of said motor; and means actuated by said control rod for operating said switch.

2. A copy lathe comprising a support; a carriage reciprocable thereon; a reciprocable control rod on said support adjacent said carriage; stops on said rod engaged by said carriage at the end of each pass of the latter; driving means for rotating a template and work piece adjacent said carriage; devices on said carriage for delineating the contour of the template upon the work piece, said devices being pneumatically urged towards the template and work piece; a valve actuated by said control rod for reversing the pneumatic elements which urge said devices to render said devices inactive in relation to the template and work piece; a reversible motor operatively connected to and adapted to actuate said driving means and said carriage; and a reversing electric switch interposed in the electric circuit of said motor and having operative connection with said control rod.

3. A copy lathe comprising a support; a carriage reciprocable thereon; a reciprocable control rod on said support adjacent said carriage; stops on said rod engaged by said carriage at the end of each pass of the latter; driving means for rotating a template and work piece adjacent said carriage; devices on said carriage movable into active and inactive positions relative to the template and work piece for delineating the contour of the former upon the latter; pneumatically operated means for moving said delineating devices into the aforesaid active and inactive positions; a valve actuated by said rod for controlling said pneumatically operated means; a reversible motor operatively connected to and adapted to actuate said driving means and said carriage; and a reversing electric switch interposed in the electric circuit of said motor and having operative connection with said control rod.

4. A copy lathe comprising a longitudinally reciprocatory tool carriage; a cutting tool and a delineating guide member mounted on said carriage for movement towards and away from a work piece and a templet respectively pneumatic means for automatically disengaging the cutting tool and the delineating guide from the work and the template at the end of each pass of said carriage; adjustable means for predetermining the length of each pass of said carriage; a reversible electric motor operatively connected to and actuating said carriage; an electric control switch for controlling the reversal of said motor; a valve for controlling the operation of said pneumatic means, and said adjustable means for predetermining the range of reciprocation of the carriage including a slide rod operatively connected to said control switch and to said valve for automatically actuating the same.

5. A copy lathe comprising a reciprocable carriage; a cutting tool rotatable thereon; means for determining the path of said tool; a pneumatically actuated device for urging the tool against a work piece; closed conduits supplying compressed air to opposite sides of said pneumatic device to effect movement thereof and to advance and retract the tool with respect to the work piece; a three-way control valve having communication with a source of air pressure, said valve adapted in one position to supply air to one of said conduits and in another position to supply air to the other of said conduits; a slide rod; stops thereon adapted to be engaged by said carriage at the end of each pass thereof to move said rod; and means operatively connecting said rod to said valve to move the latter from one of its positions to the other.

6. A copy lathe comprising a reciprocatory tool carriage; a slide rod; stops thereon adapted to be engaged by said carriage at the end of each pass thereof; pneumatic means for automatically disengaging the cutting tool and the delineating guide from the work and the template at the end of each pass of said carriage; a reversible electric motor operatively connected to and actuating said carriage; an electric control switch for controlling the reversal of said motor, said switch having operative connection with and actuated by said slide rod; and a valve actuated by the movement of said rod at the end of each pass of said carriage for controlling the operation of said pneumatic means.

7. A copy lathe comprising a reciprocable carriage; a cutting tool rotatable thereon; means for determining the path of said tool; a pneumatically actuated device for urging the tool against a work piece; air circulating pipes supplying compressed air to opposite sides of said pneumatic device to effect movement thereof and to advance and retract the tool with respect to the work piece; a three-way control valve having a communication with a source of air pressure, said valve adapted in one position to supply air to one of said pipes and in another position to supply air to the other of said pipes; a slide rod; stops thereon adapted to be engaged by said carriage at the end of each pass thereof to move said rod; means operatively connecting said rod to said valve to move the latter from one of its positions to the other; reversible drive means for moving said carriage; and means actuated by the movement of said slide rod for effecting reversal of said drive means.

8. A copy lathe comprising a reciprocatory tool carriage; means for automatically disengaging the cutting tool and the delineating guide from the work and the template at the end of each pass of said carriage; adjustable means for predetermining the length of each pass of said carriage; a reversible electric motor operatively connected to and actuating said carriage; a limit switch controlling the electric current to said motor; a slide rod actuated by the movement of said carriage; a lever arm operatively connected to said switch; a cam actuated by said rod for moving said arm; and a latch device adapted to releasably retain said cam and rod in predetermined positions at the end of each pass of said carriage.

9. A copy lathe comprising a reciprocatory carriage; a cutting tool rotatable thereon; means for guiding the tool on a work piece; a reversible electric motor operatively connected to and adapted to actuate said carriage; a limit switch controlling the electric current to said motor; a slide rod; stops on said rod adapted to be engaged by said carriage to move said rod at the end of each pass of said carriage; a swinging arm the movement of which is adapted to actuate said switch; a cam carried upon and movable with said rod for moving said arm; a releasable latch detaining said cam and said rod at the end of each movement of said rod; and means for automatically engaging and disengaging said tool with respect to the work piece at the end of each pass of said carriage.

10. A copy lathe comprising a reciprocatory carriage; a cutting tool rotatable thereon; means for guiding the tool on a work piece; a reversible electric motor operatively connected to and adapted to actuate said carriage; a limit switch controlling the electric current to said motor; a slide rod; stops on said rod adapted to be engaged by said carriage to move said rod at the end of each pass of said carriage; a swinging arm the movement of which is adapted to actuate said switch; a cam carried upon and movable with said rod for moving said arm; a releasable latch detaining said cam and said rod at the end of each movement of said rod; pneumatic means for automatically disengaging said tool from the work piece at the end of each pass of said carriage; and devices for controlling the operation of said pneumatic means, said devices actuated by the movement of said carriage at the end of each pass thereof.

11. A copy lathe comprising a reciprocatory carriage; a cutting tool rotatable thereon; means for guiding the tool on a work piece; a reversible electric motor operatively connected to and adapted to actuate said carriage; a limit switch controlling the electric current to said motor; a slide rod; stops on said rod adapted to be engaged by said carriage to move said rod at the end of each pass of said carriage; a swinging arm the movement of which is adapted to actuate said switch; a cam carried upon and movable with said rod for moving said arm; a releasable latch detaining said cam and said rod at the end of each movement of said rod; pneumatic means for automatically disengaging said tool from the work piece at the end of each pass of said carriage; a valve controlling the operation of said pneumatic means; and devices connecting said valve and slide rod for operating said valve at the end of each pass of said carriage.

12. A copy lathe comprising a template member; a work member; actuating means for moving said members; a reciprocable carriage movable in parallel relation to said members; a cutter operable upon said work member; actuating means for said cutter; a guide engaged with said template; said cutter and guide mounted upon and movable with said carriage for traversing said template and work members; means normally urging said guide and cutter towards said members; driving means for moving said carriage; means for limiting reciprocatory movement of said carriage in both directions; control means actuated by said limiting means for effecting the release of the means which urge said guide and cutter towards their respective members; and other control means actuated by said limiting means for stopping movement of said members and said driving means.

13. A copy lathe comprising a template member; a work member; actuating means for moving said members; a reciprocable carriage movable in parallel relation to said members; a cutter operable upon said work member; actuating means for said cutter; a guide engaged with said template; said cutter and guide mounted upon and movable with said carriage for traversing said template and work members; common means normally urging said guide and cutter towards said members; driving means for moving said carriage; movable means for limiting reciprocatory movement of said carriage in both directions; pneumatic means for withdrawing said guide and cutter from their respective members; and control means actuated by said limiting means for energizing said pneumatic means to withdraw said guide and cutter from their respective members and for stopping movement of said members and said driving means.

14. A copy lathe comprising a reciprocable carriage; a reversible motor; means operatively connecting said carriage and motor; stops for predetermining the length of each pass of said carriage; a reversing switch in the electric circuit of said motor; a reciprocal control rod upon which said stops are mounted; means actuated by said rod for moving said reversing switch at the end of each pass of said carriage; devices on said carriage for separately engaging a template and a work piece during each pass of the carriage; yieldable devices on said carriage for urging said first-mentioned devices towards the template and the work piece; and means actuated by said control rod for releasing said yieldable devices to move said first-mentioned devices away from the template and work piece at the end of each pass of said reciprocable carriage.

15. A copy lathe comprising a reciprocable carriage; a reversible motor; means operatively connecting said carriage and motor; stops for predetermining the length of each pass of said carriage; a reversing switch in the electric circuit of said motor; a reciprocal control rod upon which said stops are mounted; means actuated by said rod for moving said reversing switch at the end of each pass of said carriage; devices on said carriage for separately engaging a template and a work piece during each pass of the carriage; pneumatic devices on said carriage for urging said first-mentioned devices towards the template and the work piece; and a control valve actuated by said rod for releasing said pneumatic devices to move said first-mentioned devices away from the template and work piece at the end of each pass of said reciprocable carriage.

WILLEM GROEN.